US012722902B2

(12) United States Patent
Osborne et al.

(10) Patent No.: US 12,722,902 B2
(45) Date of Patent: Sep. 1, 2026

(54) SPIRAL CONVEYOR MULTIPLE DRIVE SYSTEM

(71) Applicant: JBT Marel Corporation, Chicago, IL (US)

(72) Inventors: Cory N. Osborne, North Ridgeville, OH (US); Carl J. Gavlik, Norwalk, OH (US); Rami Toumi, Ardmore, PA (US)

(73) Assignee: JBT Marel Corporation, Chicago, IL (US)

( * ) Notice: Subject to any disclaimer, the term of this patent is extended or adjusted under 35 U.S.C. 154(b) by 44 days.

(21) Appl. No.: 18/978,784

(22) Filed: Dec. 12, 2024

(65) Prior Publication Data

US 2026/0167429 A1 Jun. 18, 2026

(51) Int. Cl.
*B65G 23/36* (2006.01)
*B65G 17/38* (2006.01)
(Continued)

(52) U.S. Cl.
CPC ........... *B65G 23/36* (2013.01); *B65G 17/385* (2013.01); *B65G 21/18* (2013.01); *B65G 43/00* (2013.01);
(Continued)

(58) Field of Classification Search
CPC ...... B65G 23/36; B65G 17/385; B65G 21/18; B65G 43/00; B65G 2203/0291;
(Continued)

(56) References Cited

U.S. PATENT DOCUMENTS 4,741,430 A * 5/1988 Roinestad .............. B65G 23/34 198/833
4,850,475 A * 7/1989 Lupo ...................... B65G 21/18 198/833
(Continued)

FOREIGN PATENT DOCUMENTS

AU 44123 72 A 2/1974
DE 202020003302 U1 9/2020
(Continued)

OTHER PUBLICATIONS

B. Langenbeck, "Drives for Tunnel Boring Machines," Tunnel, <https://www.tunnel-online.info/en/artikel/tunnel_Drives_for_Tunnel_Boring_Machines-3560202.html>, Apr. 2020, 2 pages.
(Continued)

*Primary Examiner* — Mark A Deuble
(74) *Attorney, Agent, or Firm* — Christensen O'Connor Johnson Kindness PLLC

(57) ABSTRACT

A multi-drive system includes a plurality of drive motors, a variable frequency drive coupled to each drive motor, a drive head coupled to each drive motor, a drive ring couplable to the rotatable drum, the drive ring engageable with the plurality of drive heads, and a controller coupled to the plurality of variable frequency drives. A method of operating a multi-drive system includes sending an initial speed command to each variable frequency drive, reading a nominal operating torque of each drive motor, computing a first total torque of the system and a first reference torque for each drive motor, sending a first adjusted speed command so a first applied torque is substantially equivalent to the first reference torque; and adjusting the speed command if a drive motor is disengaged from the multi-drive system.

20 Claims, 7 Drawing Sheets

(51) Int. Cl.
*B65G 21/18* (2006.01)
*B65G 43/00* (2006.01)

(52) U.S. Cl.
CPC .. *B65G 2203/0291* (2013.01); *B65G 2207/24* (2013.01)

(58) Field of Classification Search
CPC .. B65G 2207/24; B65G 15/02; B65G 17/066; B65G 17/068; B65G 17/086
USPC .......................................................... 198/778
See application file for complete search history.

(56) References Cited

U.S. PATENT DOCUMENTS 5,191,267 A * 3/1993 Machacek .............. B65G 21/18 318/67
5,850,781 A * 12/1998 Kuenen .................... A21B 1/48 432/143
6,523,677 B1 * 2/2003 DeGennaro ............ B65G 21/18 198/781.04
7,331,445 B2 2/2008 Roland
8,926,463 B1 * 1/2015 Eldor ..................... B65G 21/18 474/148
9,145,259 B2 9/2015 Tassy, Sr. et al.
9,604,788 B2 * 3/2017 Eldor ..................... B65G 21/18
9,884,723 B2 * 2/2018 Neely .................... B65G 21/18
10,968,045 B1 4/2021 Westcott et al.
11,008,173 B1 * 5/2021 Wilthorn ................ B65G 23/16
2021/0130100 A1 * 5/2021 Wilthorn ................ B65G 23/16

FOREIGN PATENT DOCUMENTS

DE 10 2020 004 666 B3 7/2021
EP 3 412 604 A1 12/2018
NL 2001010 * 5/2009
WO 2022/022878 A1 2/2022

OTHER PUBLICATIONS

International Search Report and Written Opinion mailed Mar. 31, 2026, issued in corresponding International Application No. PCT/US2025/058542, filed Dec. 8, 2025, 13 pages.

* cited by examiner

SPIRAL CONVEYOR MULTIPLE DRIVE SYSTEM

BACKGROUND

Spiral conveyors are an efficient means for moving products up or down in a production environment while minimizing the floor space required, thus creating flexibility in the design of production environments. One type of spiral conveyor employs a drive tower in the form of a cylindrical drum or cage that is driven to rotate about a vertical axis by a traditional low tension drive design, such as a centerdrive design or a chain drive design. In a centerdrive design, a single large drive motor is located at or near the rotational center of the drive tower, and operation of this single large drive motor turns the drive tower around a center of rotation. In a chain drive design, a single large drive motor is located external to the outer perimeter of the drive tower, and operation of this single large drive motor draws a chain around the perimeter of a drive ring attached to the drive tower.

The commonality between these traditional designs and other traditional designs is the reliance on a single large drive motor as a powersource. The primary drawback of this type of design is that the drive motor must be very large in order to have the necessary power to drive the load.

The physical size of the drive motor makes it expensive to stock a spare and very difficult to replace, in the event of a failure. When a failure does occur in the main drive motor, the entire spiral loader system will be down until the component is repaired or replaced. Even when customers do have spares on hand (which isn't always the case), replacing the gearmotor can take an entire day to complete. It is also not uncommon for the main drive motor to weigh 2,000 lbs or more, thus requiring the use of specialized equipment for any required movement of parts. When customers do not have spare parts or drive motors on hand, this leads them to scramble to find replacements as quickly as possible, sometimes causing the machine to be down for even longer periods. While some drive motors can last for many years with proper maintenance, for applications in harsh environments or with frequent exposure to materials that can degrade the performance of the drive motor, failure of the drive motor can occur at least every few years.

As such, there is a need to develop a powersource for a spiral conveyor that is able to continue to operate despite any failures, especially for these harsher operating environments.

The present disclosure seeks to provide a drive system capable of solving these and related problems.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope the claim subject matter.

Aspects of the present disclosure relate to multi-drive systems for a rotatable drum of a spiral conveyor and methods of operating a multi-drive system for a rotatable drum of a spiral conveyor.

In accordance with an embodiment of the present disclosure, a multi-drive system for a rotatable drum of a spiral conveyor comprises: a plurality of drive motors; a variable frequency drive operably coupled to each drive motor; a drive head operably coupled to each drive motor; a drive ring configured to be operably couplable to the rotatable drum, the drive ring further configured to be operably engageable with the plurality of drive heads; and a controller operably coupled to the plurality of variable frequency drive, wherein the controller causes the multi-drive system to perform operations including: sending an initial speed command to each variable frequency drive; reading, from each variable frequency drive, a nominal operating torque of each drive motor; computing, from the nominal operating torque of each drive motor, a first total torque of the system and a first reference torque for each drive motor; if required, sending a first adjusted speed command to each variable frequency drive so a first applied torque of each drive motor is substantially equivalent to the first reference torque; and monitoring the plurality of drive motors for faults, wherein, when a fault is detected and the applicable drive motor is disengaged from the system, the controller computes a second total torque of the system and a second reference torque for each remaining drive motor, and wherein the controller further sends a second adjusted speed command to each variable frequency drive of the remaining variable frequency drives, wherein the second adjusted speed command results in a second applied torque substantially equivalent to the second reference torque.

In any of the embodiments herein, the plurality of drive motors is four drive motors.

In any of the embodiments herein, the plurality of drive motors is five or more drive motors.

In any of the embodiments herein, the drive motor is a gearmotor.

In any of the embodiments herein, the plurality of drive motors is configured to be mounted elevationally below the rotatable drum.

In any of the embodiments herein, the plurality of drive motors is configured to be mounted elevationally above the rotatable drum.

In any of the embodiments herein, the plurality of drive motors is configured to be mounted circularly around an axis of rotation of the rotatable drum, and wherein the plurality of drive motors is configured to be positioned on the radial interior side of the drive ring.

In any of the embodiments herein, the plurality of drive motors is configured to be mounted circularly around an axis of rotation of the rotatable drum, and wherein the plurality of drive motors is configured to be positioned on the radial exterior side of the drive ring.

In any of the embodiments herein, the drive ring includes a plurality of drive head engagement members.

In any of the embodiments herein, the plurality of drive head engagement members are selected from the group consisting of teeth, cogs, rollers, and a chain.

In any of the embodiments herein, the controller causes the system to perform additional operations including: generating an alert if a loading in the rotatable drum is over the available capacity of the multi-drive system.

In any of the embodiments herein, the first applied torque level of each drive motor smaller in magnitude than the nominal operating torque of each drive motor of the plurality of drive motors.

In any of the embodiments herein, the drive head is a sprocket.

In accordance with an embodiment of the present disclosure, a method of driving a rotatable drum of a spiral conveyor comprises: sending an initial speed command to a variable frequency drive; reading, from the variable frequency drive, a nominal operating torque of each drive motor of a plurality of drive motors, wherein: each drive motor is operably coupled to the variable frequency drive; each drive motor is operably coupled to a drive head; the drive head is operably coupled to a drive ring; and the drive ring is operably coupled to a rotatable drum; computing, from the nominal operating torque of each drive motor, a first total torque on the system and a first reference torque for each drive motor; if required, sending a first adjusted speed command to each variable frequency drive so a first applied torque of each drive motor is substantially equivalent to the first reference torque; and monitoring the plurality of drive motors for faults, wherein, when a fault is detected and the applicable drive motor is disengaged from the system, a second total torque of the system is computed and a second reference torque for each remaining drive motor is computed, and a second adjusted speed command is sent to the remaining variable frequency drives, wherein the second adjusted speed command results in a second applied torque substantially equivalent to the second reference torque.

In any of the embodiments herein, the plurality of drive motors is four drive motors.

In any of the embodiments herein, the method further comprises generating an alert if a loading in the rotatable drum is over the available capacity of the plurality of drive motors.

In any of the embodiments herein, the drive ring includes a plurality of drive head engagement members.

In any of the embodiments herein, the plurality of drive head engagement members are selected from the group consisting of teeth, cogs, rollers, and a chain.

In any of the embodiments herein, the first applied torque of each drive motor is smaller in magnitude than the nominal operating torque of each drive motor.

In any of the embodiments herein, a plurality of PID controllers are configured to modulate the first adjusted speed command during operation of the plurality of drive motors to generate a microadjusted speed command, wherein the microadjusted speed command enables the first applied torque at each drive motor to remain substantially equivalent to the first reference torque throughout operation of the plurality of drive motors.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
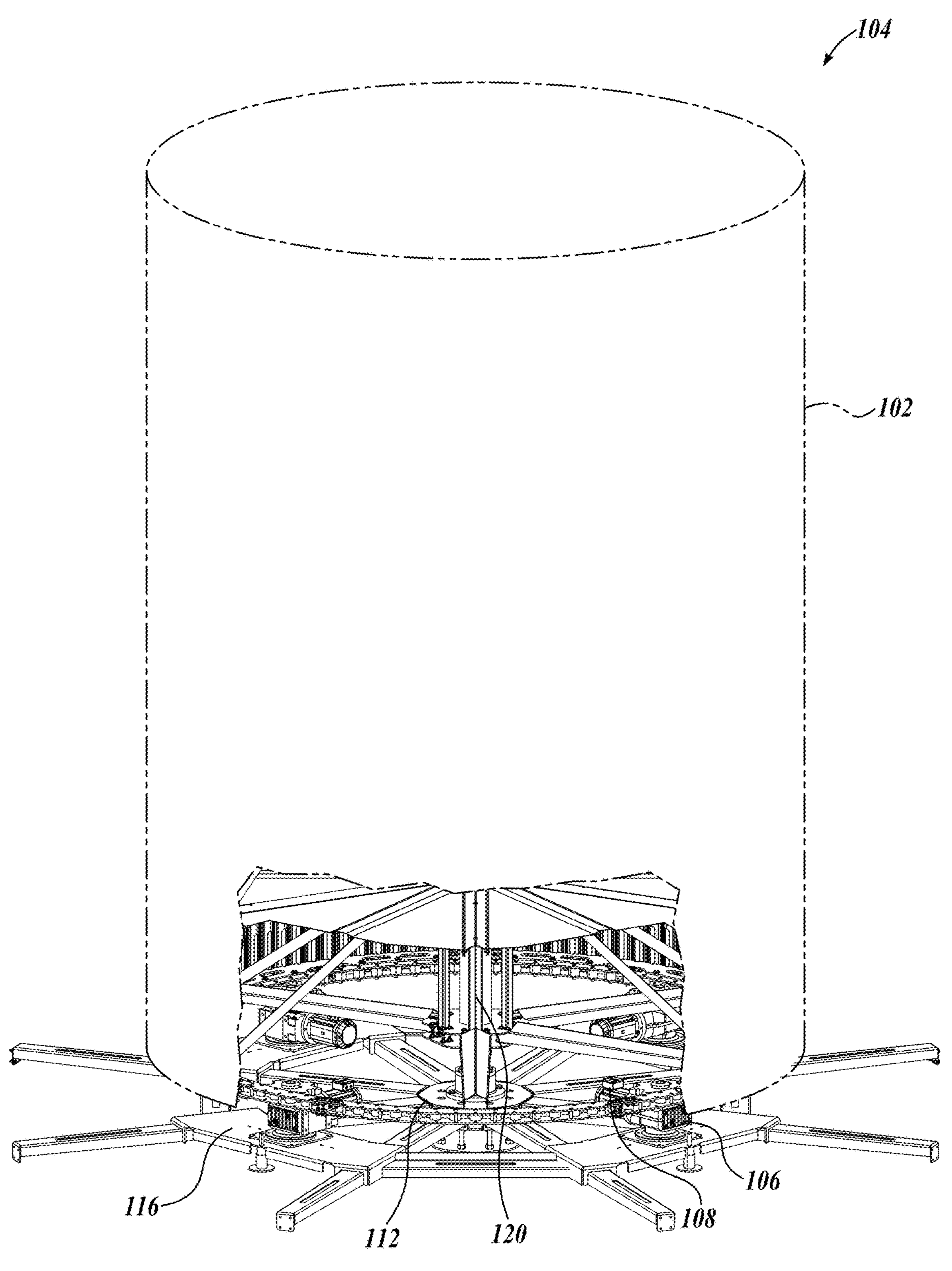
FIG. 1 illustrates a spiral conveyor that may be driven using the multi-drive system of the present disclosure.

The detailed description set forth below in connection with the appended drawings, where like numerals reference like elements, is intended as a description of various embodiments of the disclosed subject matter and is not intended to represent the only embodiments. Embodiments described in this disclosure are provided merely as examples or illustrations and should not necessarily be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification. That is, the present disclosure includes embodiments that combine features from different embodiments.

In the following description, numerous specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

In the detailed description herein, references to "one embodiment", "an embodiment", "an example embodiment", "one or more embodiments, etc., indicate that the embodiment described may include a particular feature, structure, or characteristic, but every embodiment may not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or subcombinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term “plurality” is meant to be any number that is more than one, for example, two, three, four, five, etc. The term “about,” “approximately,” etc., means plus or minus 5% of the stated value. The term “based upon” means “based at least partially upon.” In the claims and for purposes of the present disclosure, the terms “a”, “an”, “the”, and the like, refer to the singular and the plural forms of the object or element referenced.

The present application may include references to “directions,” such as “forward,” “rearward,” “front,” “back,” “ahead,” “behind,” “upward,” “downward,” “above,” “below,” “horizontal,” “vertical,” “top,” “bottom,” “right of the present disclosure, wherein a plurality of grooves extend along the length of the cap drive face. hand,” “left hand,” “in,” “out,” “extended,” “advanced,” “retracted,” “proximal,” and “distal.” These references and other similar references in the present application are only to assist in helping describe and understand the present disclosure (such as when the embodiment is positioned for use) and are not intended to limit the present invention to these directions.

The present application may include modifiers such as the words “generally,” “approximately,” “about,” or “substantially.” These terms are meant to serve as modifiers to indicate that the “dimension,” “shape,” “temperature,” “time,” or other physical parameter in question need not be exact but may vary as long as the function that is required to be performed can be carried out. For example, in the phrase “generally circular in shape,” the shape need not be exactly circular as long as the required function of the structure in question can be carried out.

FIG. 1 illustrates a spiral conveyor 104 composed of a support structure 116 on which a multi-drive system 100 and a rotatable drum 102 are mounted. In the illustrated embodiment, rotatable drum 102 includes a base portion that couples to a drive ring 112 of the multi-drive system 100. Rotatable drum 102 can be any cylindrical drum or cage that is driven about an axis, such as the vertical axis defined by central post 120. In an embodiment, rotatable drum 102 is an example of the drive drum tower described in detail in U.S. Pat. Pub. No. 10,968,045, published Apr. 6, 2021, which is incorporated by reference herein in its entirety for all purposes.

When the drive ring 112 of the multi-drive system 100 is in operation, it rotates the rotatable drum 102 at a speed defined by the multi-drive system 100. FIG. 1 illustrates the multi-drive system 100 coupling to the rotatable drum 102 substantively at the base of rotatable drum 102, such that the multi-drive system 100 is elevationally below the rotatable drum 102. However, it is to be understood that the coupling between multi-drive system 100 and rotatable drum 102 can be in any suitable configuration. For example, multi-drive system 100 can couple to rotatable drum 102 substantively at a top portion of rotatable drum 102, such that the multi-drive system 100 is elevationally above the rotatable drum 102. While the terms “at the base” and “at a top portion” are used with reference to the illustrated rotatable drum 102 with an axis of rotation that is substantively perpendicular to the ground, it is to be understood that the multi-drive system 100 can couple to the rotatable drum 102 at either face of the rotatable drum 102 in any configuration with respect to the ground.

Figure 2:
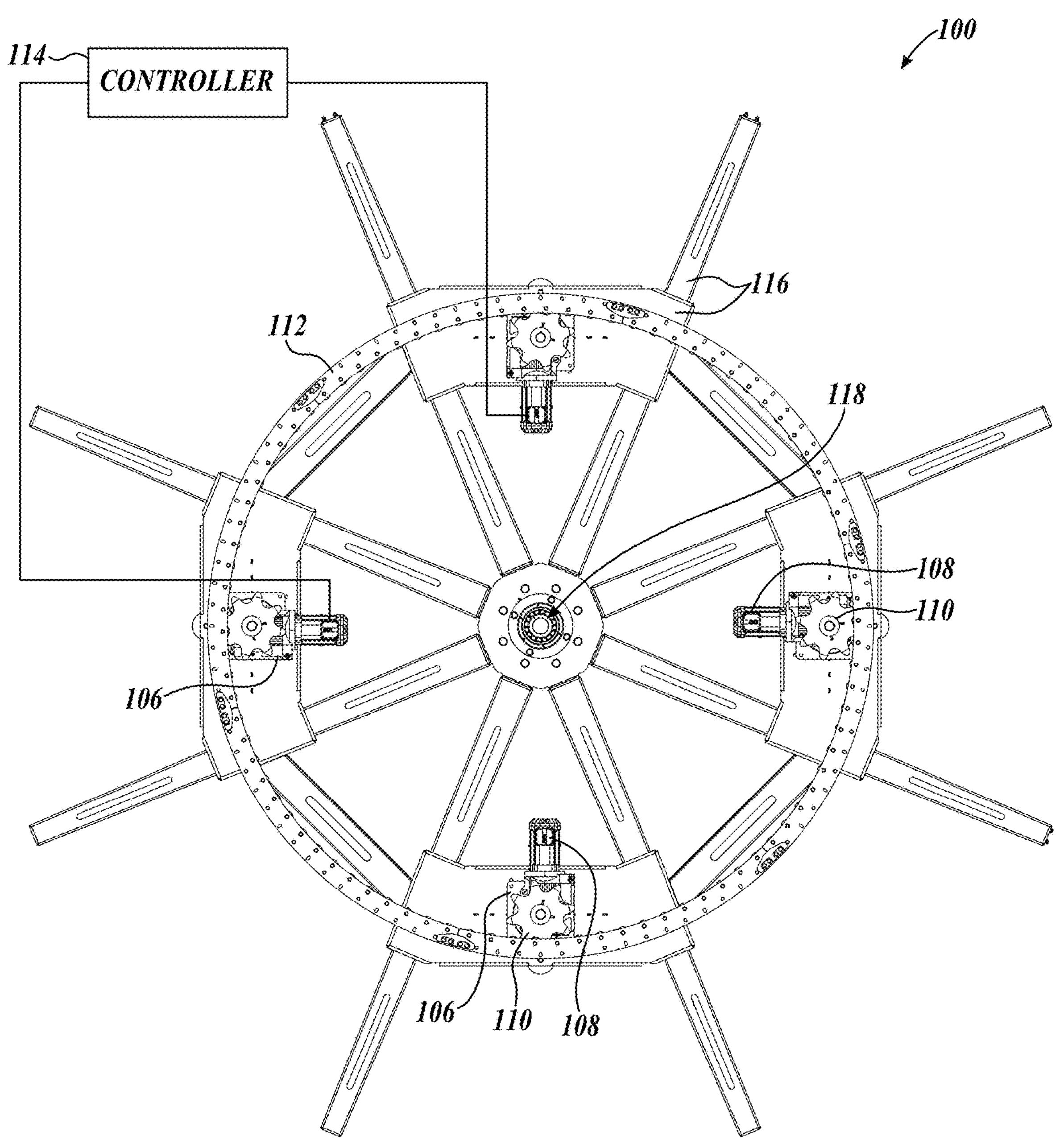
FIG. 2 is a top view of a multi-drive system.

Turning to FIG. 2-FIG. 5, the multi-drive system 100 will now be described. Referring initially to FIG. 2, as noted above, the rotatable drum of a spiral conveyor couples to a drive ring of a multi-drive system, such as multi-drive system 100. Multi-drive system 100 includes a plurality of drive motors 106, where each drive motor 106 is operably coupled to a variable frequency drive 108, and where each drive motor 106 is operably coupled to a drive head 110. The drive head 110 is operably coupled to the drive ring 112. A controller 114 communicates with the variable frequency drive 108 as is described further herein below with respect to FIG. 6 and FIG. 7. In an embodiment, the plurality of drive motors 106 are coupled to a support structure 116 for the spiral conveyor 104, however, the plurality of drive motors 106 need not be coupled to a support structure 116 and can instead be mounted externally to the support structure 116 for the spiral conveyor 104 and thus be mounted independent of the spiral conveyor 104.

In an embodiment, the plurality of drive motors 106 is four drive motors. In an embodiment, the plurality of drive motors 106 may be five or more drive motors, such as six drive motors, seven drive motors, or eight or more drive motors.

In the illustrated embodiment, the drive motor is a gearmotor, however it is to be understood that other types of drive motors can be used, such as a DC motor, a permanent magnet motor, and a stepper motor. In the illustrated embodiments, drive head 110 is a sprocket, but it should be understood that any suitable drive head 110 can be used that is configurable to couple to both drive motor 106 and drive ring 112, thereby allowing the drive motor 106 to drive the rotation of drive ring 112.

In the illustrated embodiment of FIG. 2, the plurality of drive motors 106 are arranged around a perimeter of the drive ring 112, such as in a circular arrangement around an axis of rotation 118 of the multi-drive system 100. By this arrangement, each drive head 110 is operably engageable with the drive ring 112, thereby allowing the drive motor 106 to drive the drive head 110, which in turn drives the drive ring 112. As the drive ring 112 is driven, a rotatable drum 102 coupled to the drive ring 112 can be rotated. The drive motors 106 can be positioned along the radially interior side of the drive ring 112. Such a configuration provides the advantage of containing all working pieces within the footprint of the rotatable drum 102. However, the drive motors 106 can similarly be positioned along a radially exterior side of the drive ring 112, such as where easy access to the drive motor 106 for repairs and maintenance are desired. Similarly, in the illustrated embodiment, the drive motors 106 are positioned at substantially equidistant positions around the perimeter of the multi-drive system 100; but it is also possible for the drive motors 106 to be positioned in a staggered orientation.

Unlike traditional spiral conveyor systems, the use of multiple drive motors 106 allows for each drive motor 106 to be smaller than a single centralized drive motor. This has the advantage of allowing for easy storage of replacement parts or replacement drive motors inside a production facility, and further allows for the multi-drive system 100 to continue to operate if one or more of the drive motors 106 becomes inoperable, such as due to a malfunction of a drive motor 106. The flexibility of such a system can improve operation schedules and decrease storage costs for spare drive motors.

Figure 3:
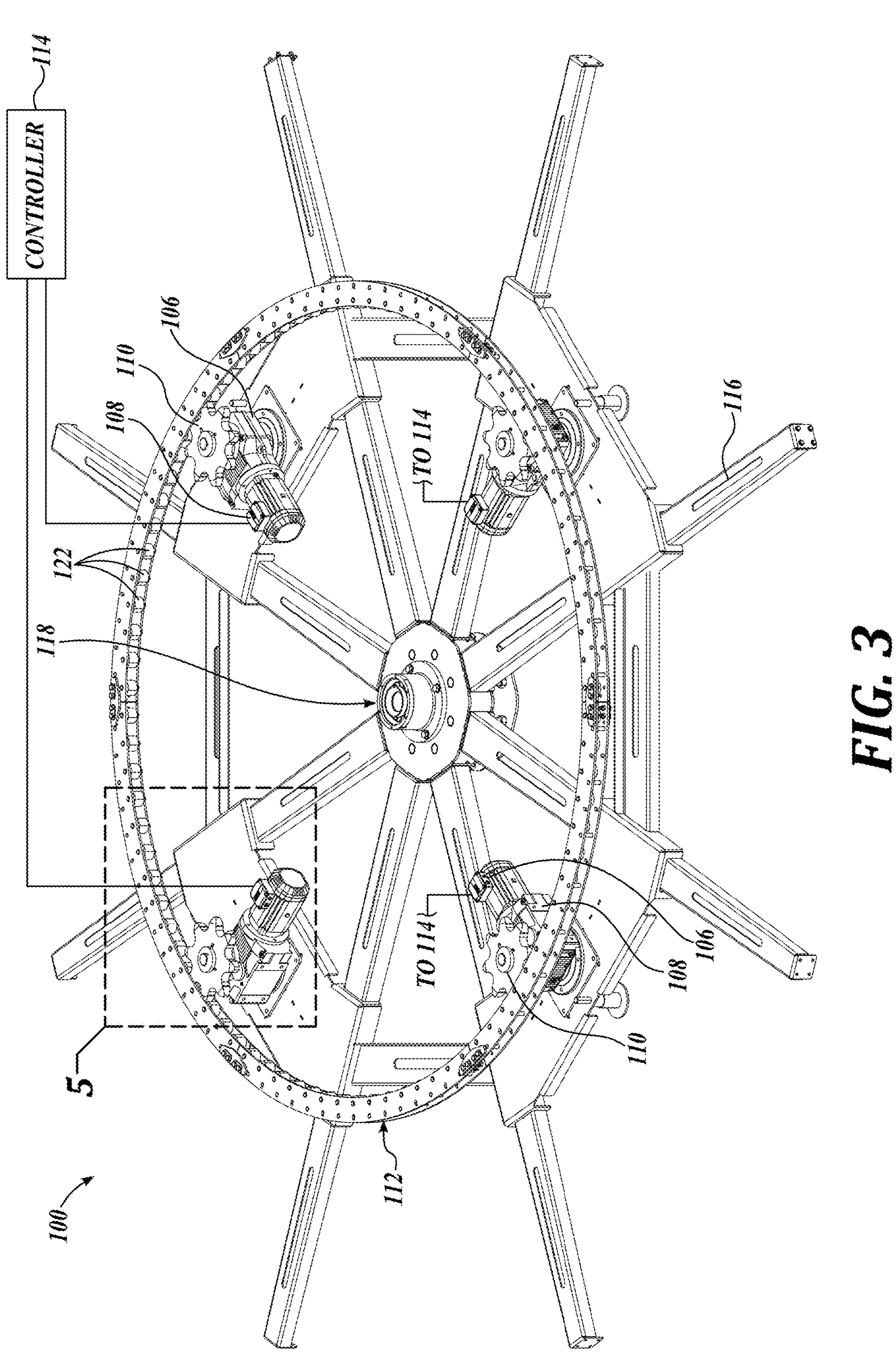
FIG. 3 is an isometric view of the multi-drive system of FIG. 2.
Figure 5:
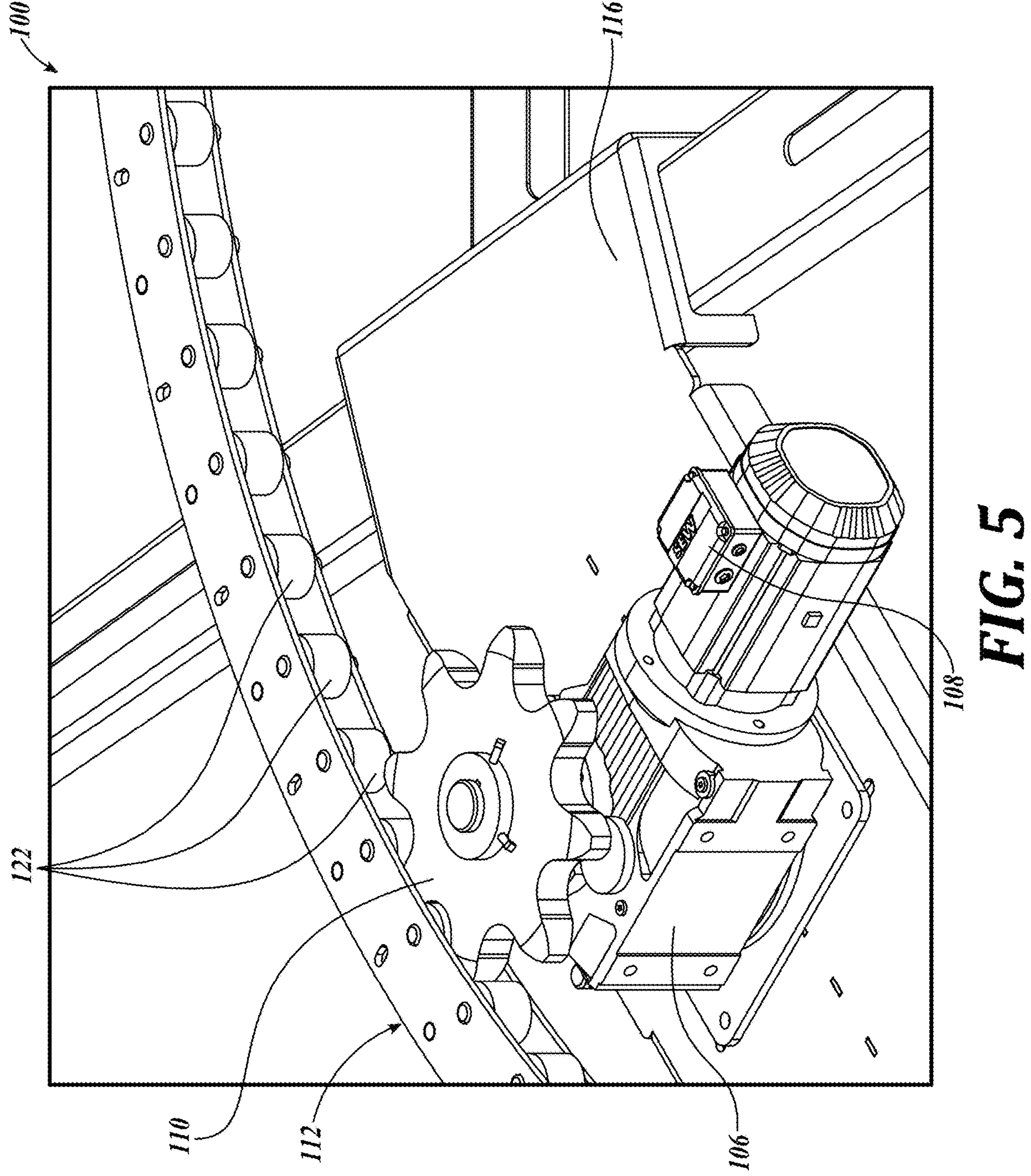
FIG. 5 is an isometric view of a portion of the multi-drive system of FIG. 2.

As shown best in FIG. 3 and FIG. 5, in an embodiment, the drive ring 112 includes a plurality of drive head engagement members, such as drive head engagement members 122. In an embodiment, drive head engagement members 122 can include teeth, cogs, rollers, a chain, and the like. In the illustrated embodiment, drive head 110 is a sprocket, and drive head engagement members 122 are sprocket engagement members, for example, rollers.

Accordingly, in an embodiment, as the drive motor 106 drives the sprocket, the teeth of the sprocket engage with the sprocket drive head engagement members, thereby causing a rotation of the drive ring 112. By synchronizing the operation speed of the plurality of drive motors 106, the plurality of drive heads 110 can work together to rotate the drive ring 112.

In an embodiment, drive ring 112 is a rigid drive ring. In an embodiment, drive ring 112 comprises a drive chain. An advantage of a rigid drive ring is that a rigid drive ring can be more operationally secure with respect to the drive heads 110. As such, less time is required repairing and remounting a rigid drive ring to the drive heads than would be required with a drive chain. On the other hand, because a drive chain can change conformation to engage with the drive heads 110, a drive chain can be selected when operational flexibility is desired. The synchronized operation of the drive motors 106 can be accomplished using the control methods described further herein below with respect to FIG. 6 and FIG. 7.

As noted above, in an embodiment, one or more of the drive motors 106 can be removed from the multi-drive system 100 without the multi-drive system 100 requiring significant downtime. In traditional systems, the failure of a single drive motor can result in downtime of up to several weeks if difficult to repair parts are required. In the multi-drive systems described herein, though, the multi-drive system 100 is able to continue operation following removal of a drive motor 106, such as in the multi-drive system 100 depicted in FIG. 4.

Figure 4:
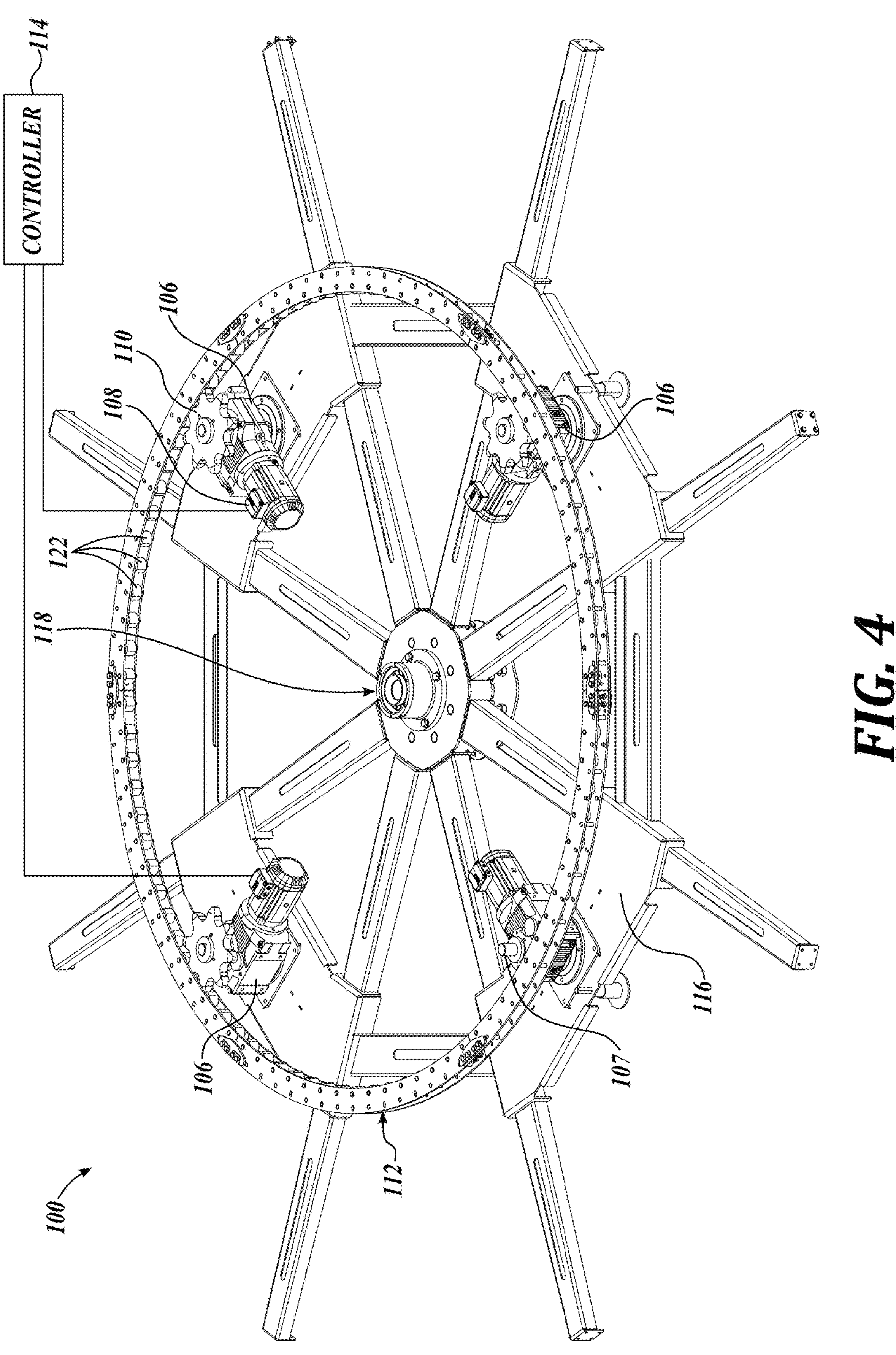
FIG. 4 is an isometric view of a multi-drive system with a disengaged drive motor.

When an operator notes a failure of a drive motor 106 or some other malfunction of drive motor 106, and it is determined that a drive motor 106 is inoperable, the operator or other user can disengage the faulty drive motor 106, thereby making it a disengaged drive motor 107, as illustrated in FIG. 4. In an embodiment, disengaged drive motor 107 can be disengaged from the drive ring 112 without substantially moving the disengaged drive motor 107, such as by removing the drive head 110. However, it is to be noted that disengaged drive motor 107 can be disengaged by any suitable means, such as by removing disengaged drive motor 107 from the system for repairs, or by sending a signal to the disengaged drive motor 107 to cause the drive head 110 to disengage from the drive ring 112. Once the disengaged drive motor 107 is decoupled from the drive ring 112, the multi-drive system 100 can begin operation with the remaining plurality of drive motors 106 as described further herein below with respect to FIG. 7.

Figure 6:
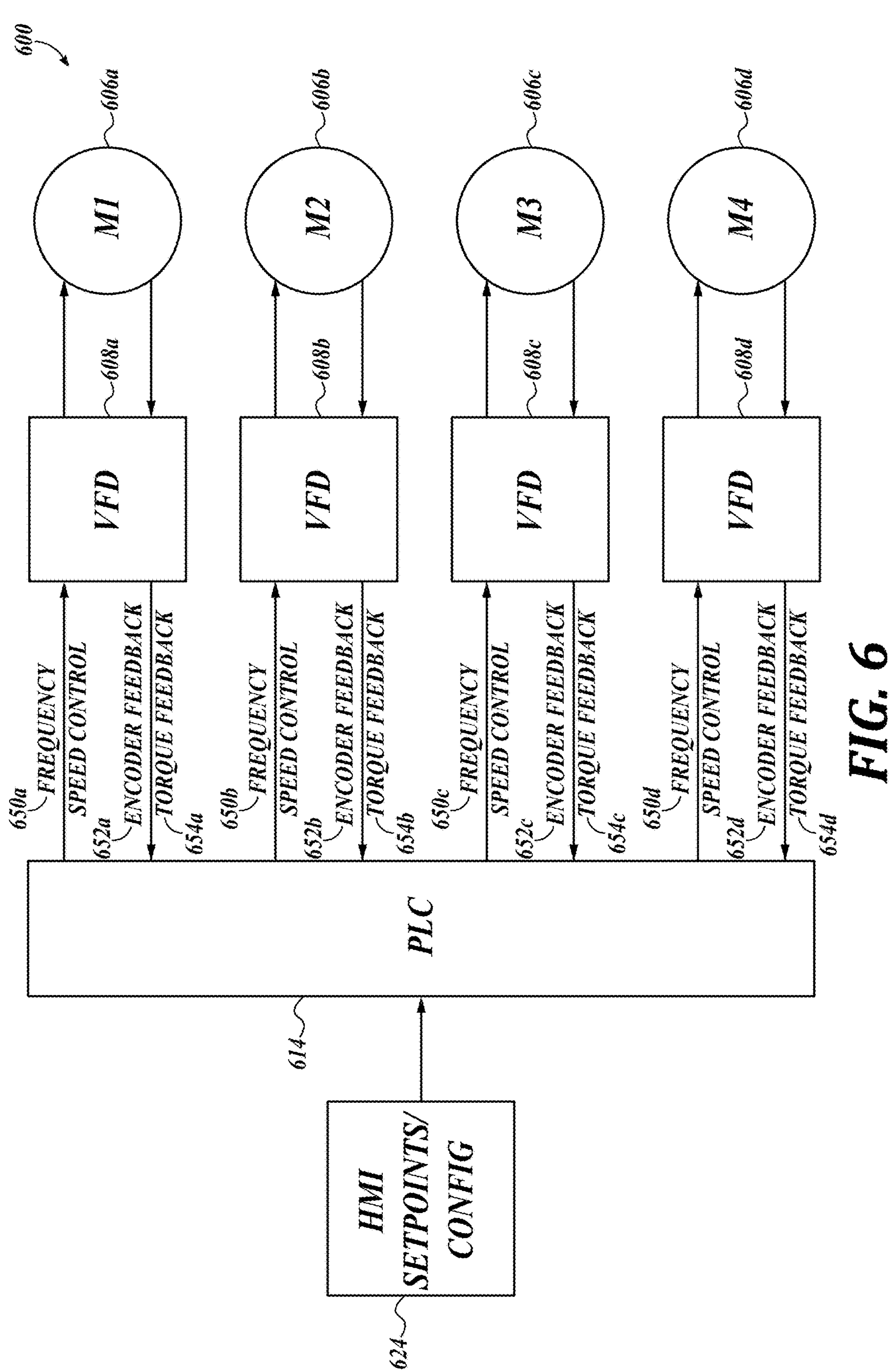
FIG. 6 is a block diagram showing a control scheme for a multi-drive system.

Turning to FIG. 6, the operation of a controller, such as controller 114, will next be described. The controller for the multi-drive system, such as controller 114, is operably coupled to the plurality of variable frequency drives, such as variable frequency drives 108, and is configured to both send signals from the variable frequency drives and receive signals from the variable frequency drives. In this way, the controller is in two-way communication with the multi-drive system.

The controller can perform additional operations besides operating the multi-drive system as described further herein below, for example, generating an alert if a loading in the rotatable drum is over the available capacity of the multi-drive system.

An example schematic of the operation of the controller, such as controller 114, is provided in FIG. 6 and FIG. 7, discussed further herein below. While FIG. 6 refers to a multi-drive system comprising four drive motors, it is to be understood that the method described by FIG. 6 can be adapted to any multi-drive system comprising two or more drive motors, as described further herein above.

FIG. 6 depicts engaged drive motor process 600, which, in an embodiment, can be used to operate the multi-drive system, such as the multi-drive system 100 described further herein above. Engaged drive motor process 600 can thus be used to operate the multi-drive system when each drive motor of the plurality of drive motors are engaged with the drive ring.

In engaged drive motor process 600, a user or operator can input commands to the multi-drive system, such as multi-drive system 100, via a human machine interface 624. Human machine interface 624 is the controlling hardware and software which is an interface between the user and the multi-drive system and which enables the users to communicate with the whole system. In the illustrated embodiment, the human machine interface 624 communicates to an external programmable logic controller 614; however, it should be understood that the human machine interface 624 and programmable logic controller 614 can also be integrated into a single control unit.

In an embodiment, programmable logic controller 614 is an example of controller 114, described further herein above with respect to FIG. 1-FIG. 5. Programmable logic controller 614 is configured to be in operational communication with each variable frequency drive, such as variable frequency drives 608*a*, 608*b*, 608*c*, and 608*d*. In an embodiment, variable frequency drives 608*a*, 608*b*, 608*c*, and 608*d* are each examples of variable frequency drive 108, described further herein above. Each of variable frequency drives 608*a*, 608*b*, 608*c*, and 608*d* are further in operational communication with drive motors 606*a*, 606*b*, 606*c*, and 606*d*, which, in an embodiment, are examples of drive motor 106. Thus, from the human machine interface 624, a user or operator of the multi-drive system 100 can independently control each of variable frequency drives 608*a*, 608*b*, 608*c*, and 608*d* and drive motors 606*a*, 606*b*, 606*c*, and 606*d*.

In engaged drive motor process 600, a user interacting with human machine interface 624 can send an initial speed command, such as from frequency speed controls 650*a*, 650*b*, 650*c*, and 650*d*, to each drive motor. The initial speed command can be used as a diagnostic to identify a nominal operating speed for each drive motor such as from encoder feedback 652*a*, 652*b*, 652*c*, and 652*d*, or to identify a nominal operating torque for each drive motor such as from torque feedback 654*a*, 654*b*, 654*c*, and 654*d*. It is to be understood that while identifying from the variable frequency drive the nominal operating speed and the nominal operating torque are described as alternatives, the present disclosure is not limited to the use of one or the other, and that embodiments where both nominal operating torque and nominal operating speed are identified are within the scope of this disclosure.

For example, an initial speed command can be sent to variable frequency drive 608*a*, and said signal can then be relayed to drive motor 606*a*. Once drive motor 606*a* responds by operating according to the initial speed command, the variable frequency drive 608*a* can identify the nominal operating torque of drive motor 606*a*, and the programmable logic controller 614 can read from variable frequency drive 608*a* the nominal operating torque of drive motor 606*a*. As another example, an initial speed command can be sent to variable frequency drive 608*a*, and said signal can then be relayed to drive motor 606*a*. Once drive motor 606*a* responds by operating according to the initial speed command, the variable frequency drive 608*a* can identify the nominal operating speed of drive motor 606*a* via an encoder that is linked to variable frequency drive 608*a*, and the programmable logic controller 614 can read from the variable frequency drive 608*a* the nominal operating speed of drive motor 606*a*.

Subsequently, in an embodiment, an initial speed command can be sent to each of variable frequency drives 608*b*, 608*c*, and 608*d* and relayed respectively to drive motors 606*b*, 606*c*, and 606*d*, from which either a nominal operating torque of drive motors 606*b*, 606*c*, and 606*d* can be read by the programmable logic controller 614, or a nominal operating speed of drive motors 606*b*, 606*c*, and 606*d* can be read by the programmable logic controller 614. In this way, the programmable logic controller 614 can identify the nominal operating torque or the nominal operating speed of each of drive motors 606*a*, 606*b*, 606*c*, and 606*d*.

In an embodiment, from the individual nominal operating torques of each of drive motors 606*a*, 606*b*, 606*c*, and 606*d*, programmable logic controller 614 can compute a first total torque of the system, which represents a maximum amount of torque that can be applied for the initial speed command.

Additionally, programmable logic controller 614 can determine a first reference torque for each of drive motors 606*a*, 606*b*, 606*c*, and 606*d*. For example, programmable logic controller 614 can identify the torque required to operate a rotatable drum such as rotatable drum 102, at a desired rotational speed. The first reference torque can thus be defined by the torque required to operate the rotatable drum evenly divided among each of drive motors 606*a*, 606*b*, 606*c*, and 606*d*, such that applying the first reference torque to each of drive motors 606*a*, 606*b*, 606*c*, and 606*d* will generate the torque required to operate the rotatable drum at the desired speed.

In an embodiment, the first reference torque for each of drive motors 606*a*, 606*b*, 606*c*, and 606*d* is smaller in magnitude compared to the nominal operating torque for each of drive motors 606*a*, 606*b*, 606*c*, and 606*d*. Thus, a multi-drive system, such as multi-drive system 100, has the capacity to operate with more torque than the torque required to operate the rotatable drum, and can thus be configured to operate with redundant capacity beyond that required to operate a spiral conveyor, such as spiral conveyor 104.

Programmable logic controller 614 can then send a first adjusted speed command to variable frequency drives 608*a*, 608*b*, 608*c*, and 608*d*, where the first adjusted speed command is smaller in magnitude when compared to the initial speed command. When the first adjusted speed command is relayed to the drive motors 606*a*, 606*b*, 606*c*, and 606*d*, the drive motors 606*a*, 606*b*, 606*c*, and 606*d* operate with a first applied torque, where the first adjusted speed command and the first applied torque are selected so that the first applied torque is substantially equivalent to the first reference torque. In this way, the sum of the first reference torques for drive motors 606*a*, 606*b*, 606*c*, and 606*d*, and the sum of the first applied torques for drive motors 606*a*, 606*b*, 606*c*, and 606*d*, will each be substantially equivalent to the torque required to operate the rotatable drum.

In another embodiment, programmable logic controller 614 can compare the nominal operating speeds of each of drive motors 606*a*, 606*b*, 606*c*, and 606*d* to the desired rotational speed. Programmable logic controller 614 can then send a first adjusted speed command to variable frequency drives 608*a*, 608*b*, 608*c*, and 608*d*, where the magnitude of the first adjusted speed command accounts for any differences between the nominal operating speeds of each of drive motors 606*a*, 606*b*, 606*c*, and 606*d* operating at the initial speed command and the desired rotational speed of the rotatable drum. Thus, all available drive motors can be adjusted to operate at the same speed.

Figure 7:
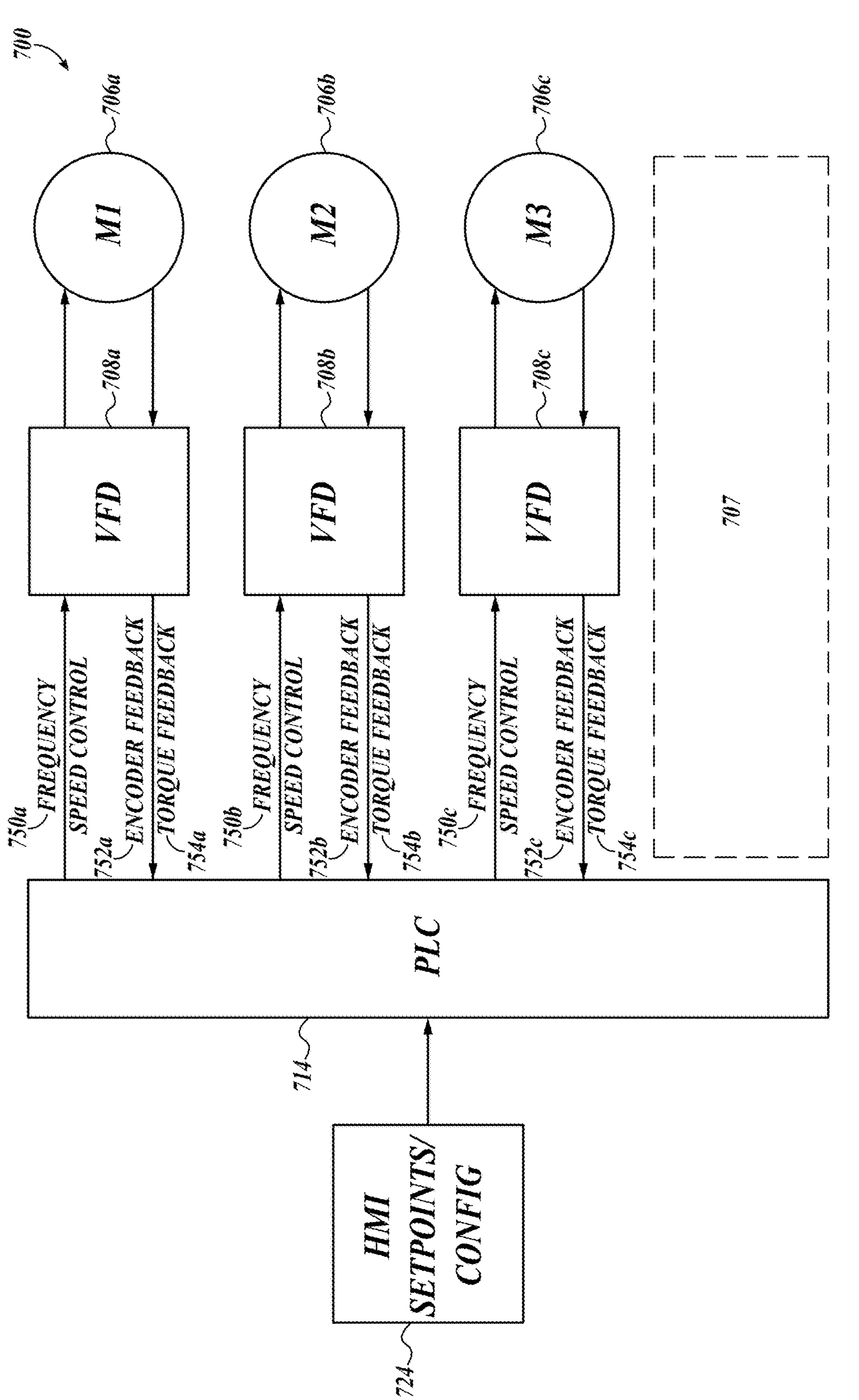
FIG. 7 is a block diagram showing a control scheme for a multi-drive system with a disengaged drive motor.

Referring next to FIG. 7, disengaged drive motor process 700 can be used to operate the multi-drive system 100 described further herein above when a faulty drive motor has been disengaged from the multi-drive system, such as multi-drive system 100 (depicted in FIG. 1-FIG. 5). Disengaged drive motor process 700 can be used to operate the multi-drive system, such as the multi-drive system 100, when one or more drive motors are disengaged drive motors, such as disengaged drive motor 107 (depicted in FIG. 4), and where a remaining plurality of drive motors remain engaged with a drive ring, such as drive ring 112. While disengaged drive motor process 700 will be described with respect to a single disengaged drive motor, it is to be understood that disengaged drive motor process 700 can also be performed with two or more disengaged drive motors and that such processes are within the scope of the present disclosure.

In an embodiment, the performance of the plurality of drive motors is monitored for faults. When a fault is detected, a user can disengage the faulty drive motor from the multi-drive system, as is described with respect to FIG. 4 and disengaged drive motor 107. In this way, disengaged drive motor process 700 is substantially identical to engaged drive motor process 600, with the exception that one variable frequency drive and one drive motor (together, a disengaged drive motor system 707) have been disengaged from the programmable logic controller. Thus, parts of the disengaged drive motor process 700 will be labeled with identical part numbers as the engaged drive motor process 600 except in the '700 series.

When disengaged drive motor system 707 is disengaged from the multi-drive system, the programmable logic controller 714 computes a second total torque of the system and a second reference torque, where the second total torque is calculated by summing the nominal operating torques for each of the remaining plurality of drive motors 706*a*, 706*b*, and 706*c*, and where the second reference torque is calculated by dividing the torque required to operate the rotatable drum evenly between each of drive motors 706*a*, 706*b*, and 706*c*. Thus, in the illustrated embodiment, the torque required to operate the rotatable drum is divided between three drive motors as opposed to the four drive motors in FIG. 6. Accordingly, the second reference torque will be larger in magnitude when compared to the first reference torque because fewer drive motors are used to generate the same torque required to operate the rotatable drum.

The programmable logic controller 714 next sends a second adjusted speed command to each of variable frequency drives 708*a*, 708*b*, and 708*c*, thus relaying instructions to the variable frequency drives 708*a*, 708*b*, and 708*c* to operate each of drive motors 706*a*, 706*b*, and 706*c* with a second applied torque substantially equivalent to the second reference torque. Thus, the multi-drive system operated according to disengaged drive motor process 700 can continue to operate despite the failure of one or more of the drive motors without requiring extensive downtime for repairs or replacements of parts. Thus, an advantage of the multi-drive systems described herein is the torque redundancy introduced by including multiple drive motors.

In another embodiment, when disengaged drive motor system 707 is disengaged from the multi-drive system, the programmable logic controller 714 sends an initial speed command to each of variable frequency drives 708*a*, 708*b*, and 708*c*, thus relaying instructions to the variable frequency drives 708*a*, 708*b*, and 708*c* to operate each of drive motors 706*a*, 706*b*, and 706*c*. Once drive motors 706*a*,

706*b*, and 706*c* respond by operating according to the initial speed command, the variable frequency drives 708*a*, 708*b*, and 708*c* can identify the nominal operating speed of drive motors 706*a*, 706*b*, and 706*c* via an encoder that is linked to variable frequency drives 708*a*, 708*b*, and 708*c*, and the programmable logic controller 714 can read from the variable frequency drives 708*a*, 708*b*, and 708*c* the nominal operating speed of drive motors 706*a*, 706*b*, and 706*c*.

Programmable logic controller 714 can compare the nominal operating speeds of each of drive motors 706*a*, 706*b*, and 706*c* to the desired rotational speed. Programmable logic controller 714 can then send a first adjusted speed command to variable frequency drives 708*a*, 708*b*, and 708*c*, where the magnitude of the first adjusted speed command accounts for any differences between the nominal operating speeds of each of drive motors 706*a*, 706*b*, and 706*c* operating at the initial speed command and the desired rotational speed of the rotatable drum. Thus, all available drive motors can be adjusted to operate at the same speed, and the multi-drive system operated according to disengaged drive motor process 700 can continue to operate despite the failure of one or more of the drive motors without requiring extensive downtime for repairs or replacements of parts.

In an embodiment, the controller, such as programmable logic controller 614 or 714, can further comprise a plurality of proportional-integral-derivative (PID) controllers. Such PID controllers can be configured to modulate the first adjusted speed command or the second adjusted speed command during operation of the plurality of drive motors to generate a microadjusted speed command. For example, when the programmable logic controller 614 or 714 identify irregularities in the operation of the plurality of drive motors, such as deviations in the operating torque of the drive motors, the PID controllers can communicate the microadjusted speed command, thus allowing the first applied torque or the second applied torque to remain substantially equivalent to the first reference torque or the second reference torque throughout operation of the plurality of drive motors. Such a configuration has the advantage of allowing the multi-drive system to continue operating despite changes in operating conditions that may require adjustments to the process, such as, for example, changes in the level of product loading on the conveyor belt, changes in the desired cooking time that require a change in the rotational speed of the drum, or changes in the desired freezing time that require a change in the rotational speed of the drum, among others.

While illustrative embodiments have been illustrated and described, it will be appreciated that various changes can be made therein without departing from the spirit and scope of the invention.

The embodiments of the invention in which an exclusive property or privilege is claimed are defined as follows:

1. A multi-drive system for a rotatable drum of a spiral conveyor, the multi-drive system comprising:
- a plurality of drive motors;
- a variable frequency drive operably coupled to each drive motor;
- a drive head operably coupled to each drive motor;
- a drive ring configured to be operably couplable to the rotatable drum, the drive ring further configured to be operably engageable with the plurality of drive heads; and
- a controller operably coupled to the plurality of variable frequency drive, wherein the controller causes the multi-drive system to perform operations including:
  - sending an initial speed command to each variable frequency drive;
  - reading, from each variable frequency drive, a nominal operating torque of each drive motor;
  - computing, from the nominal operating torque of each drive motor, a first total torque of the system and a first reference torque for each drive motor;
  - if required, sending a first adjusted speed command to each variable frequency drive so a first applied torque of each drive motor is substantially equivalent to the first reference torque; and
  - monitoring the plurality of drive motors for faults, wherein, when a fault is detected and the applicable drive motor is disengaged from the system, the controller computes a second total torque of the system and a second reference torque for each remaining drive motor, and wherein the controller further sends a second adjusted speed command to each variable frequency drive of the remaining variable frequency drives, wherein the second adjusted speed command results in a second applied torque substantially equivalent to the second reference torque.

2. The multi-drive system of claim 1, wherein the plurality of drive motors is four drive motors.

3. The multi-drive system of claim 1, wherein the plurality of drive motors is five or more drive motors.

4. The multi-drive system of claim 1, wherein the drive motor is a gearmotor.

5. The multi-drive system of claim 1, wherein the plurality of drive motors is configured to be mounted elevationally below the rotatable drum.

6. The multi-drive system of claim 1, wherein the plurality of drive motors is configured to be mounted elevationally above the rotatable drum.

7. The multi-drive system of claim 1, wherein the plurality of drive motors is configured to be mounted circularly around an axis of rotation of the rotatable drum, and wherein the plurality of drive motors is configured to be positioned on the radial interior side of the drive ring.

8. The multi-drive system of claim 1, wherein the plurality of drive motors is configured to be mounted circularly around an axis of rotation of the rotatable drum, and wherein the plurality of drive motors is configured to be positioned on the radial exterior side of the drive ring.

9. The multi-drive system of claim 1, wherein the drive ring includes a plurality of drive head engagement members.

10. The multi-drive system of claim 9, wherein the plurality of drive head engagement members are selected from the group consisting of teeth, cogs, rollers, and a chain.

11. The multi-drive system of claim 1, wherein the controller causes the system to perform additional operations including: generating an alert if a loading in the rotatable drum is over the available capacity of the multi-drive system.

12. The multi-drive system of claim 1, wherein the first applied torque level of each drive motor is smaller in magnitude than the nominal operating torque of each drive motor of the plurality of drive motors.

13. The multi-drive-system of claim 1, wherein the drive head is a sprocket.

14. A method of driving a rotatable drum of a spiral conveyor, the method comprising:
- sending an initial speed command to a variable frequency drive;
- reading, from the variable frequency drive, a nominal operating torque of each drive motor of a plurality of drive motors, wherein: each drive motor is operably coupled to the variable frequency drive; each drive motor is operably coupled to a drive head; the drive head is operably coupled to a drive ring; and the drive ring is operably coupled to a rotatable drum;

computing, from the nominal operating torque of each drive motor, a first total torque on the system and a first reference torque for each drive motor;

if required, sending a first adjusted speed command to each variable frequency drive so a first applied torque of each drive motor is substantially equivalent to the first reference torque; and monitoring the plurality of drive motors for faults, wherein, when a fault is detected and the applicable drive motor is disengaged from the system, a second total torque of the system is computed and a second reference torque for each remaining drive motor is computed, and a second adjusted speed command is sent to the remaining variable frequency drives, wherein the second adjusted speed command results in a second applied torque substantially equivalent to the second reference torque.

15. The method of claim 14, wherein the plurality of drive motors is four drive motors.

16. The method of claim 14, further comprising generating an alert if a loading in the rotatable drum is over the available capacity of the plurality of drive motors.

17. The method of claim 14, wherein the drive ring includes a plurality of drive head engagement members.

18. The method of claim 17, wherein the plurality of drive head engagement members are selected from the group consisting of teeth, cogs, rollers, and a chain.

19. The method of claim 14, wherein the first applied torque of each drive motor is smaller in magnitude than the nominal operating torque of each drive motor.

20. The method of claim 14, wherein a plurality of proportional-integral-derivative (PID) controllers are configured to modulate the first adjusted speed command during operation of the plurality of drive motors to generate a microadjusted speed command, wherein the microadjusted speed command enables the first applied torque at each drive motor to remain substantially equivalent to the first reference torque throughout operation of the plurality of drive motors.

* * * * *